United States Patent
Jaradi et al.

(10) Patent No.: US 10,442,393 B2
(45) Date of Patent: Oct. 15, 2019

(54) PIVOTING LATCH PLATE FOR SEATBELT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 15/814,956

(22) Filed: Nov. 16, 2017

(65) Prior Publication Data

US 2019/0143932 A1 May 16, 2019

(51) Int. Cl.
*B60R 22/18* (2006.01)
*B60R 22/28* (2006.01)
*A44B 11/25* (2006.01)

(52) U.S. Cl.
CPC .......... *B60R 22/18* (2013.01); *A44B 11/2553* (2013.01); *A44B 11/2561* (2013.01); *B60R 22/28* (2013.01); *B60R 2022/1806* (2013.01); *B60R 2022/1812* (2013.01); *B60R 2022/1831* (2013.01); *B60R 2022/286* (2013.01)

(58) Field of Classification Search
CPC . B60R 22/18; B60R 22/28; B60R 2022/1812; B60R 2022/1806; B60R 2022/1831; B60R 2022/286; A44B 11/2553; A44B 11/2561; A44B 11/2538; A44B 11/25

USPC ...... 280/801.1, 805; 297/472, 468, 471, 470
See application file for complete search history.

(56) References Cited

U.S. PATENT DOCUMENTS

| | | | |
|---|---|---|---|
| 3,718,948 A * | 3/1973 | Dartois | A44B 11/2503 24/310 |
| 4,253,702 A | 3/1981 | Lehr | |
| 4,457,251 A | 7/1984 | Weman et al. | |
| 5,417,455 A * | 5/1995 | Drinane | A44B 11/2557 24/171 |
| 5,997,097 A * | 12/1999 | Engelhard | B60R 22/28 297/470 |
| 2013/0062925 A1 * | 3/2013 | Hori | B60R 22/00 297/468 |
| 2016/0021987 A1 | 1/2016 | Murase | |

FOREIGN PATENT DOCUMENTS

| | | | |
|---|---|---|---|
| CN | 203182157 U | * | 9/2013 |
| CN | 205916077 U | | 2/2017 |
| GB | 1005044 A | | 9/1965 |
| KR | 20010058912 A | | 7/2001 |
| KR | 101755993 B1 | | 7/2017 |

* cited by examiner

*Primary Examiner* — Keith J Frisby
(74) *Attorney, Agent, or Firm* — Frank A. MacKenzie; Bejin Bieneman PLC (57) ABSTRACT

A seatbelt latch plate assembly includes a latch plate, a D-ring, and a pivot stop. The D-ring is pivotably connected to the latch plate. The pivot stop is disposed between and rotatably fixes the latch plate to the D-ring. The pivot stop includes a deformable element. The deformable element is deformable at a predetermined pivot torque between the D-ring and the plate.

20 Claims, 9 Drawing Sheets

PIVOTING LATCH PLATE FOR SEATBELT

BACKGROUND

The seatbelt portion of a vehicle restraint system secures the occupant of a vehicle against harmful movement that may result from a vehicle collision. The seatbelt functions to reduce the likelihood of injury by reducing the force of occupant impacts with vehicle interior structures. In this role the seatbelt applies loads across the chest or lap of the occupant. The loads from the seatbelt may be increased by pretensioners that tighten the seatbelt upon detecting an impact occurrence or an incipient impact. Controlling or reducing these loads may reduce the risk of occupant injury during a collision.

DETAILED DESCRIPTION

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A seatbelt latch plate assembly includes a latch plate, a D-ring, and a pivot stop. The D-ring is pivotably connected to the latch plate. The pivot stop is disposed between and rotatably fixes the latch plate to the D-ring. The pivot stop includes a deformable element. The deformable element is deformable at a predetermined pivot torque between the D-ring and the plate.

A seatbelt system includes a seatbelt, a D-ring, a latch plate, a pivot pin, a pivot stop, and a buckle. The D-ring slidably receives the seatbelt. The pivot pin pivotably connects the D-ring and the latch plate. The pivot pin defines a pivot axis about which the D-ring may pivot relative to the latch plate. A pivot stop is disposed between the D-ring and the latch plate. The pivot stop rotatably fixes the D-ring to the latch plate to resist pivoting therebetween. The pivot stop includes a deformable element. The buckle selectively slidably receives the latch plate. The deformable element is deformable at a predetermined pivot torque between the D-ring and the plate.

The deformable element may be formed of plastic and the latch plate may be formed of steel.

The latch plate and the D-ring may both be formed of steel. The latch plate and the D-ring are pivotably connected to each other by a pivot pin defining a pivot axis.

The deformable element may be a shear pin disposed in an aperture in the D-Ring and in an aligned aperture in the latch plate.

The shear pin may be formed of plastic.

A plurality of shear pins may be disposed in an equal plurality of apertures in the D-ring and in an equal plurality of aligned apertures in the latch plate.

The pivot stop may include a first abutment surface and a second abutment surface. The first abutment surface may be formed of plastic integral with the D-ring and define the deformable element. The second abutment surface may be formed of steel integral with the latch plate and may engage the first abutment surface in a first condition.

The first abutment surface may be disposed on a substantially peg-shaped engagement feature. The second abutment surface may be disposed in a pocket substantially complementary to the substantially peg-shaped engagement feature and may be in receipt of the first abutment surface in the first condition.

The pocket may include a deformable wall.

The substantially peg-shaped engagement feature may be substantially square in shape.

An example restraint system 10, as illustrated in FIGS. 1-9, may be disposed in a vehicle 12. The vehicle 12 includes a first seat 14A and a second seat 14B, each for support of an occupant 16 of the vehicle 12. The restraint system 10 includes example seatbelt systems 18A, 18B for vehicle occupant locations and may include airbags (not shown) for vehicle occupant locations. Such vehicle occupant locations may include, but are not limited to, the first seat, e.g., a driver's seat 14A and the second seat, e.g., a front passenger's seat 14B.

The driver's seat 14A and the passenger's seat 14B are described herein consistent with vehicles 12 having such designated positions. The driver's seat 14A is positioned to provide access to vehicle controls such as a start switch, e.g., an ignition switch, a steering wheel, a brake pedal and an accelerator pedal. Self-driving, i.e., autonomous, vehicles may not require the provision of such controls for use by a human driver. The driver's seat 14A and the front passenger's seat 14B are shown on the left and the right side of the vehicle 12 respectively, but the positions may be reversed. In self-driving vehicles, the driver's seat 14A and passenger's seat 14B may be identical to each other, except as may be desirable to facilitate entry into and exit from vehicle 12 and seats 14A and 14B.

Figure 1:
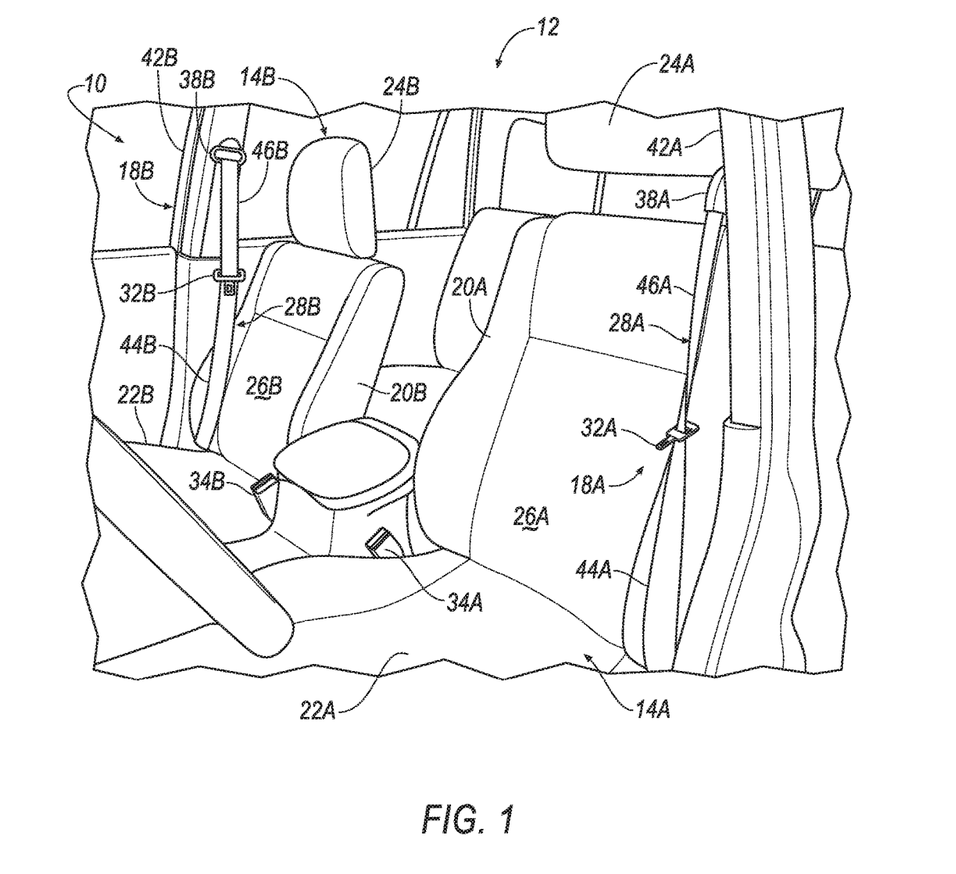
FIG. 1 is a perspective view of an interior of an example vehicle with example supplemental three-point seatbelt systems installed in the front seats.
Figure 2:
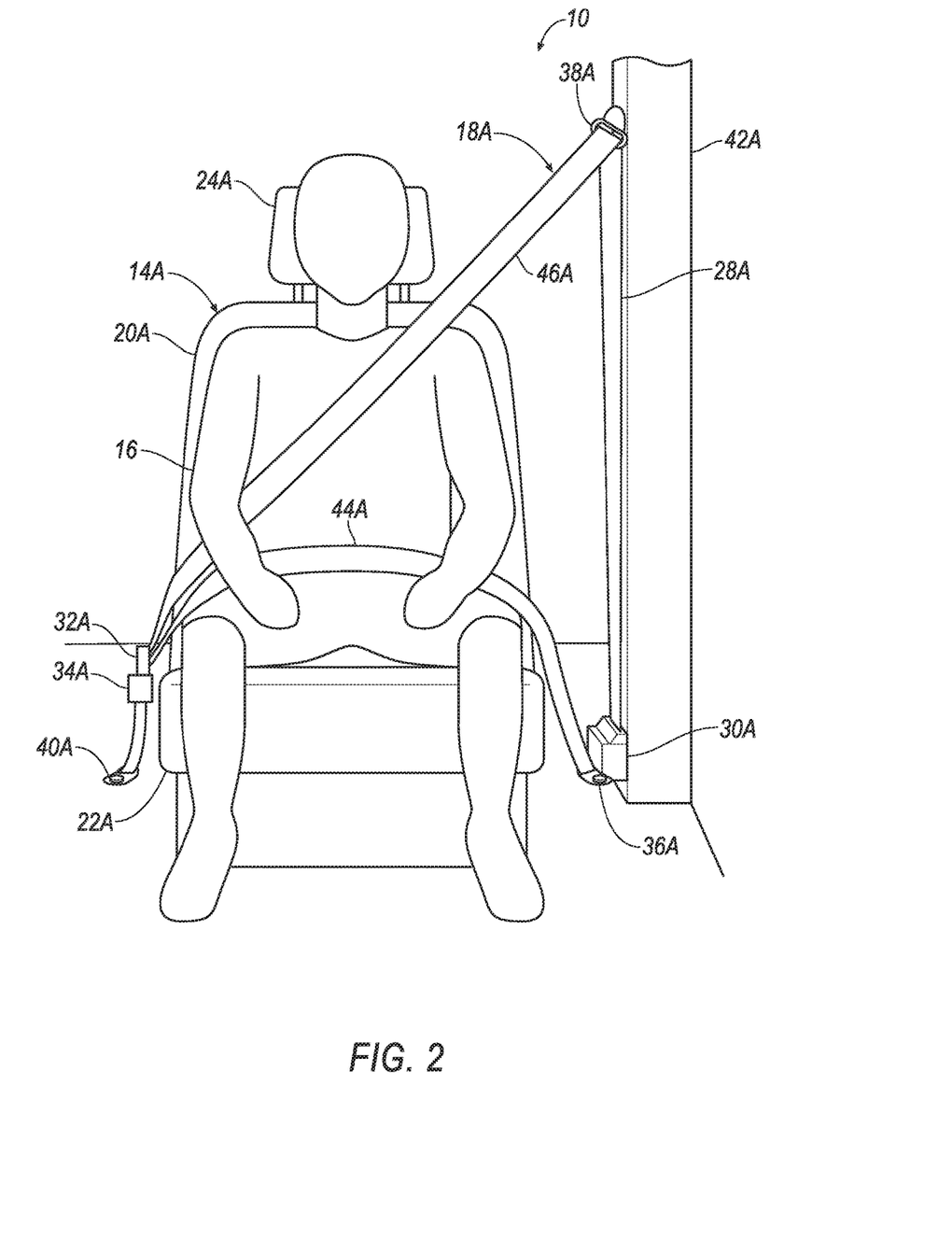
FIG. 2 is a rear-facing view of an occupied example right-hand seat with the three-point seatbelt system FIG. 1 in a fully buckled condition.

The seats 14A and 14B as shown in FIGS. 1 and 2 are bucket seats, but alternatively may be a bench seat or another type of seat or seats. The seatbelt systems 18A, 18B may be used with front seats 14A, 14B and rear seats, and with seats in any cross-vehicle position. The seats 14A, 14B may be a mirror image of each other, and may be otherwise identical. The following description will be of the driver's seat 14A and seatbelt system 18A with reference numerals followed by a suffix A. The components of the passenger's seat 14B and seatbelt system 18B are identified with the same reference numerals with a suffix B instead of a suffix A. Components labeled with the suffix B are consistent with the description of components labeled with the suffix A. The use of a reference number without a letter A or B suffix identifies such component generically, independent of location and is inclusive of components in the figures labeled with a suffix A or a suffix B.

Each seat 14A may respectively include a seat back 20A a seat bottom 22A, and a head restraint 24A. The head restraint 24A may be supported by the seat back 20A and may be stationary or movable relative to the seat back 20A. The seat back 20A may be supported by the seat bottom 22A and may be stationary or movable relative to the seat bottom 22A. The seat back 20A, the seat bottom 22A, and/or the head restraint 24A may be adjustable in multiple degrees of freedom. The seat back 20A, the seat bottom 22A, and/or the head restraint 24A may themselves be adjustable, in other words, adjustable components within the seat back 20A, the seat bottom 22A, and/or the head restraint 24A, and/or may be adjustable relative to each other.

The seat bottom 22A and/or the seat back 20A may include a seat frame (not shown) and a cushion covering 26A supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc.

The cushion covering 26A may include upholstery and padding. The upholstery may be formed of cloth, leather, faux leather, or any other suitable material. The upholstery may be stitched in panels around the frame. The padding may be between the upholstery and the frame, and may be formed of foam or any other suitable supportive material.

The illustrated seatbelt system 18A is a three-point system. By three-point, it is meant that a seatbelt, i.e., a webbing or a belt, 28A of the system 18A restrains the occupant 16 at three points. The three points may be: at a shoulder, in the example of FIG. 2 the left shoulder, as by a seatbelt retractor 30A, and on both sides of the occupant's lap, as by a seatbelt latch plate assembly 32A, i.e., a clip, in engagement with a seatbelt buckle 34A on an inboard side, and a seatbelt anchor 36A on an outboard side. A shoulder D-ring 38A may be disposed at the shoulder between the retractor 30A and the seat back 20A. The anchor 36A may include an anchor plate fixed, as illustrated, to the vehicle structure, or alternatively, to the seat frame. The buckle 34A may be fixed to the vehicle structure or the seat frame by a buckle mount 40A.

The seatbelt anchor 36A may attach one end of the seatbelt 28A to one of the seat frame and the vehicle structure. The other end of the seatbelt 28A feeds into the retractor 30A, which may include a spool that extends and retracts the seatbelt 28A. The retractor 30A may be fixed, as illustrated, to the vehicle structure, e.g., the floor, or a B-pillar 42, or alternatively, to the seat frame. The latch plate assembly 32A slides freely along the seatbelt 28A and, when engaged with the buckle 34A, divides the seatbelt 28A into a lap band 44A and a shoulder band 46A. The lap band 44A is disposed between the latch plate assembly 32A and the anchor 36A. The shoulder band 46A may be disposed between the latch plate assembly 32A and the shoulder D-ring 38A.

The seatbelt system 18A, when fastened, retains the occupant 16 in the seat 14A, e.g., during sudden decelerations of the vehicle 12.

The shoulder D-ring 38 provides a consistent orientation of the seatbelt 28A across the occupant's shoulder, e.g., in a back of the seat 14A. The shoulder D-ring 38, when included, receives the seatbelt 28A and directs the seatbelt 28A from the retractor 30A across the shoulder of the occupant 16. The shoulder D-ring 38 may be fixed to the seat back 20A, or, alternatively, to a structural component of the vehicle, e.g. a B pillar 42A. When the retractor 30A is mounted to one of the B pillar 42A and the seat frame, the shoulder D-ring 38 may be omitted from the system 18A.

Figure 3:
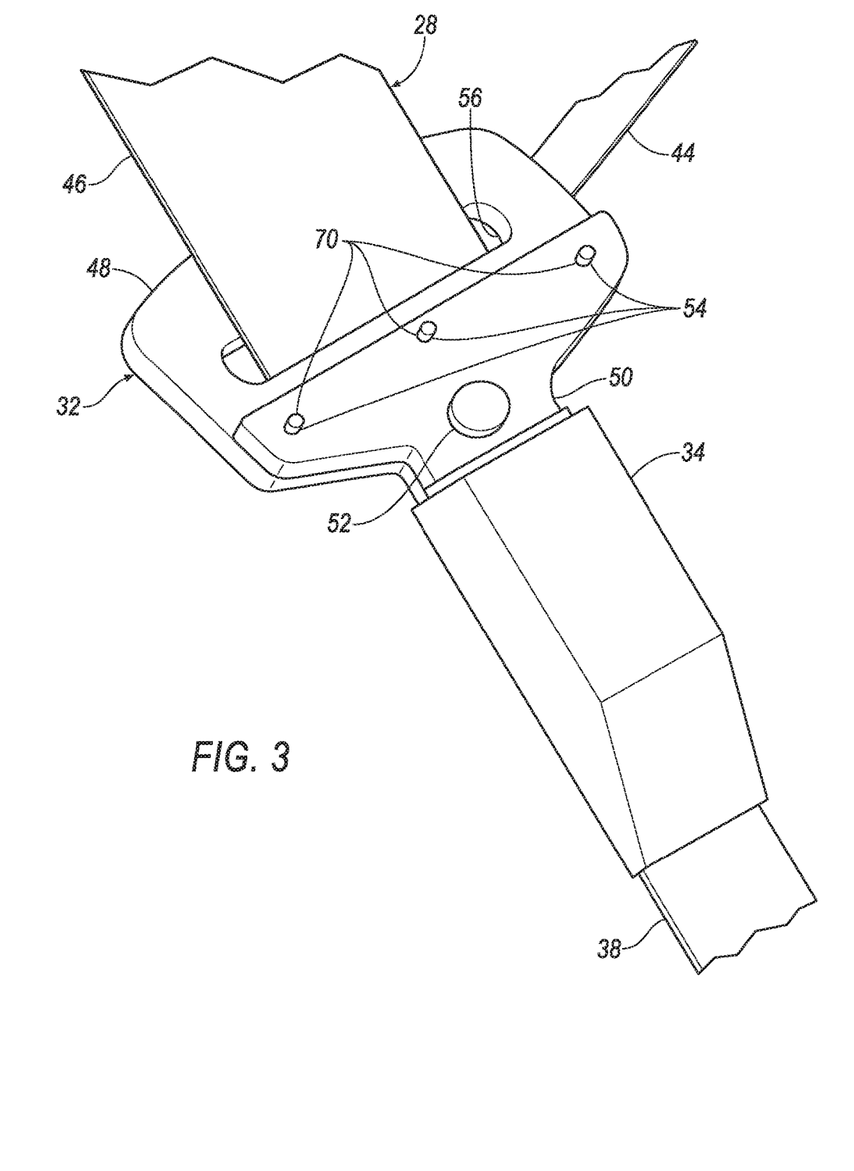
FIG. 3 is an enlarged perspective view of an example latch plate assembly in engagement with a buckle.
Figure 4:
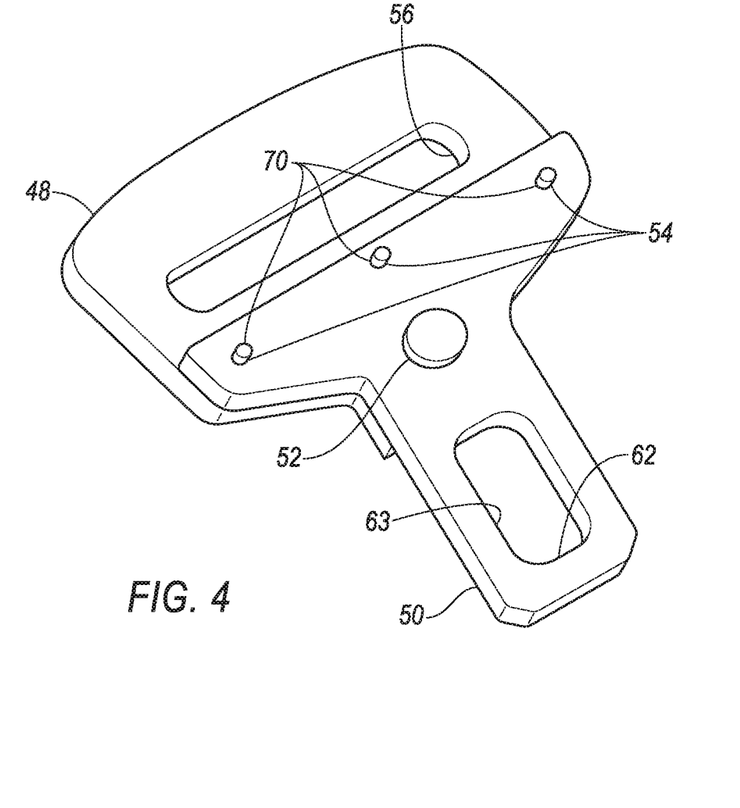
FIG. 4 is a perspective view of the latch plate assembly of FIG. 3.
Figure 5:
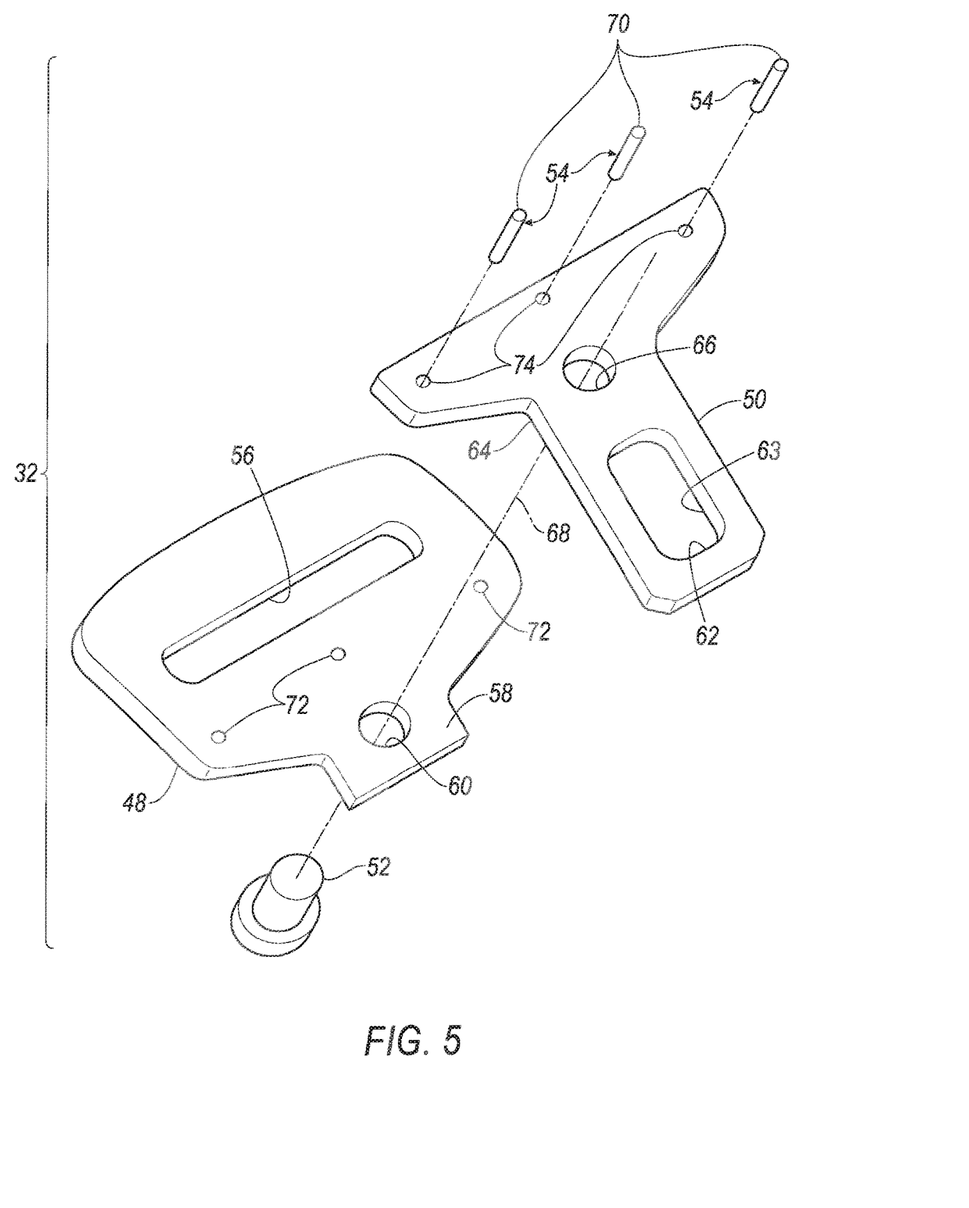
FIG. 5 is an exploded view of the latch plate assembly of FIG. 4.

With reference to the FIGS. 3-5, the example seatbelt latch plate assemblies 32A, 32B, may be identified generically as a latch plate assembly 32. The latch plate assembly 32 includes a latch plate D-ring 48 pivotably connected to a latch plate 50. A pivot pin 52 may be disposed between the latch plate 50 and the D-ring 48 to allow such a pivotable connection. A pivot stop 54 is disposed between the D-ring 48 and the latch plate 50 to rotatably fix, i.e., resist pivoting of, the latch plate 50 to the D-ring 48.

The D-ring 48 slidably receives the seatbelt 28 through its belt slot 56. The D-ring 48 divides the seatbelt 28 into the lap band 44 and the shoulder band 46 as illustrated in FIG. 3. As shown in FIG. 5, the D-ring 48 may have a first coupling area 58 adjacent to the slot 56. The coupling area 58 may have a first pin aperture 60 for receiving the pivot pin 52. The D-ring 48 may be formed of steel.

The latch plate 50 has a latch engagement surface 62 as may be provided by a latching aperture 63. The latch engagement surface 62 is operably engaged by a buckle latch (not shown) disposed within the buckle 34. Alternatively, the latch engagement surface 62 may be a raised surface (not shown) on the latch plate 50. The latch plate 50 includes a second coupling area 64 that may further have a second pin aperture 66 for receiving the pivot pin 52. The latch plate 50 may be formed of steel.

The first coupling area 58 of the D-ring 48 and the second coupling area 64 of the latch plate 50 overlap each other, and may both be smooth and flat. When the coupling areas 58, 64 are disposed against each other, the D-ring 48 and the latch plate 50 are able to pivot relative to each other with no or minimal interference with each other.

The pivot pin 52 may be a separate, discrete pin, in the form of a rivet or a threaded fastener, and may define a pivot axis 68. The pivot pin 52 may be received by both the pin apertures 60, 66 in a slip-fit relationship. Alternatively, the pin 52 may be received by one of the apertures 60, 66 in a press-fit relationship, and by the other in a slip-fit relationship. The pivot pin 52 may yet alternatively be formed integral with one of the D-ring 48 and the latch plate 50, and received by the aperture 60, 66 in the other 48, 50 providing a slip-fit relationship.

The example pivot stop 54 may include a deformable element in the form of a shear pin 70 in engagement with each of the D-ring 48 and the latch plate 50. The shear pin 70 is deformable in that it can be sheared, i.e., broken, when subjected to a vehicle impact loading condition of a predetermined magnitude as described below. The pivot stop 54 also includes a first pivot stop aperture 72 in the D-ring 48 and a second pivot stop aperture 74 in the latch plate 50. The first pivot stop aperture 72 is in receipt of a first end of the shear pin 70 and the second pivot stop aperture 74 is in receipt of a second end of the shear pin 70. The shear pin 70 may have its cross-sectional area at an interface between the coupling areas 58, 64 and the material of the shear pin 70 selected to provide a desired shear strength. The shear strength of the shear pin 70 translates into a predetermined magnitude of torsional (i.e., pivot torque) resistance to pivoting between the D-ring 48 and the latch plate 50. The torsional resistance is in part a function of a distance between the shear pin 70 and the pivot axis 68, and may be increased by moving the shear pin 70 further from the pivot axis 68. The torsional resistance may also be increased by providing a plurality of shear pins 70. In the illustrated example of FIGS. 3, 4 and 5, three shear pins 70 are provided. Materials for the shear pins 70 may include, by way of example and not limitation, plastic, aluminum and steel. The cross-sectional area of a pin 70 may be decreased as its shear strength is increased, and vice versa, to maintain a constant torsional resistance. The example pivot stop 54 may employ a plurality of pins 70. The pins 70 may be installed by first aligning the apertures 72, 74, and then pressing the pins 70 into place in the apertures 72, 74. Alternatively, the pins 70, particularly when formed of plastic, may be formed by injecting the plastic in a liquid form into the aligned apertures 72, 74, with the apertures 72, 74 serving as a mold for the pins 70. Pivoting of the D-ring 48 relative to the latch plate 50 is allowed when the predetermined magnitude of torsional resistance, i.e., torque, is exceeded and the deformable element deforms, e.g., the pin 70 shears through.

An alternative embodiment of a seatbelt latch plate assembly 32' is illustrated in FIGS. 6-9. The latch plate assembly 32' includes a latch plate D-ring 48' pivotably connected to a latch plate 50'. A pivot pin 52' may be disposed between the latch plate 50' and the D-ring 48' to allow such a pivotable connection. A pivot stop 54' is disposed between the D-ring 48' and the latch plate 50' to rotatably fix, i.e., resist pivoting of, the latch plate 50' to the D-ring 48'.

Figure 6:
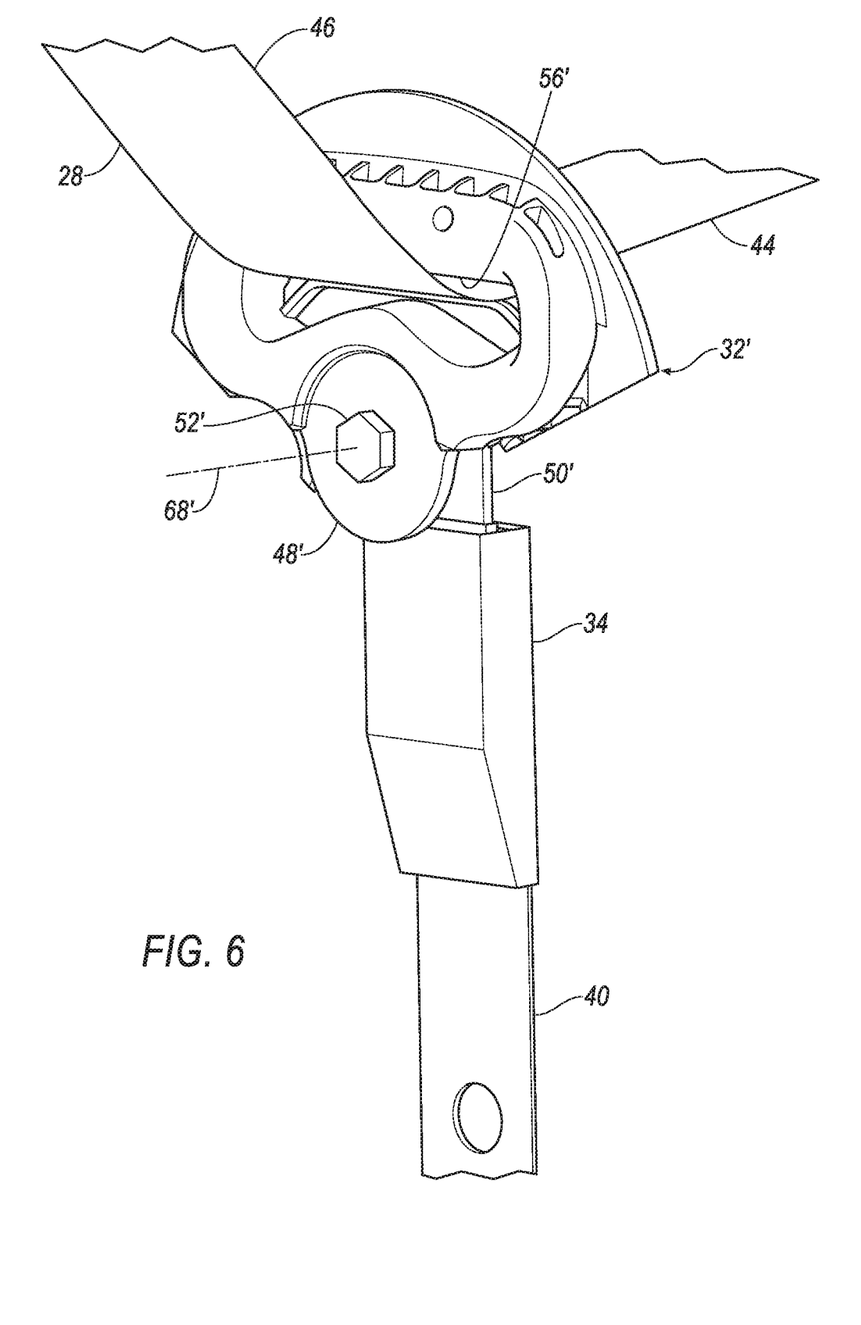
FIG. 6 is an enlarged perspective view of an alternative example latch plate assembly in engagement with a buckle in a first, undeformed position.
Figure 7:
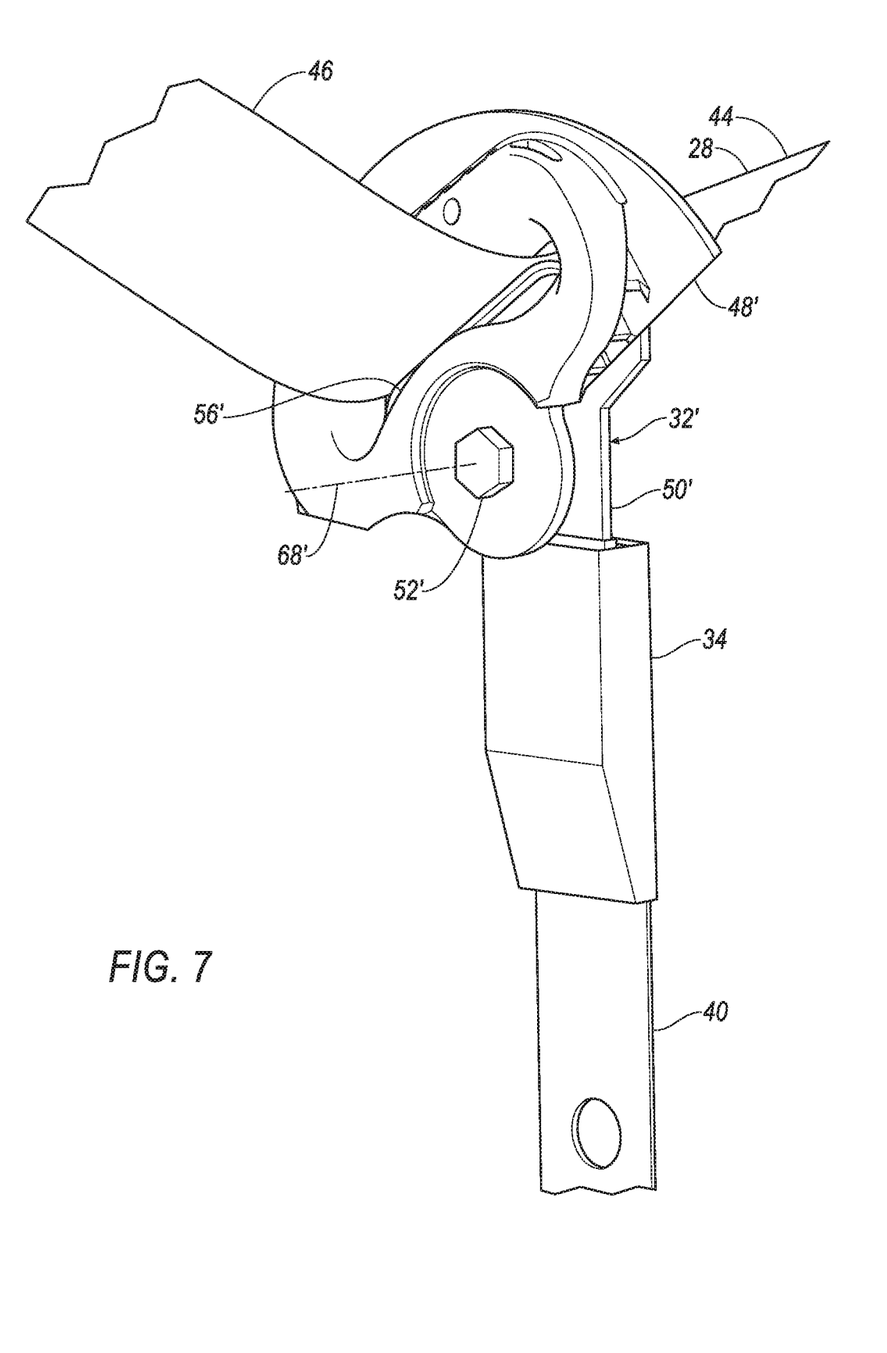
FIG. 7 is a perspective view of the latch plate assembly of FIG. 6 in a second, deformed position.

The illustrated D-ring 48' may be formed of plastic. It may have a belt slot 56' slidably receiving the seatbelt 28. The D-ring 48' divides the seatbelt 28 into the lap band 44 and the shoulder band 46 as shown in FIGS. 6 and 7. The D-ring 48' may include a boss 57' defining a first coupling area 58'. The coupling area 58' may have a first pin aperture 60' for receiving the pivot pin 52'.

The illustrated latch plate 50' may be formed of steel. The latch plate 50' has a latch engagement surface 62' as may be provided by a latching aperture 63'. The latch engagement surface 62' is operably engaged by a buckle latch (not shown) disposed within the buckle 34. Alternatively, the latch engagement surface 62' may be a raised surface (not shown) on the latch plate 50'. The latch plate 50' includes a second coupling area 64' that may further have a second pin aperture 66' for receiving the pivot pin 52'.

The first coupling area 58' of the D-ring 48' and the second coupling area 64' of the latch plate 50' overlap each other, and may both be smooth and flat. When the coupling areas 58', 64' are disposed against each other, the D-ring 48' and the latch plate 50' are able to pivot relative to each other with no or minimal interference with each other.

The pivot pin 52' may be a separate, discrete pin, in the form of a rivet or a threaded fastener, and may define a pivot axis 68'. The pivot pin 52' may be received by both the pin apertures 60', 66' in a slip-fit relationship. Alternatively, the pin 52' may be received by one of the apertures 60', 66' in a press-fit relationship, and by the other of the apertures 60', 66' in a slip-fit relationship. The pivot pin 52' may alternatively be formed integral with the latch plate 50', and received by the aperture 60' in the D-ring 48', providing a slip-fit relationship.

The example pivot stop 54' may include a first abutment surface 76' formed of plastic, integral with the D-ring 48', and defining a deformable element. The pivot stop 54' may further include a second abutment surface 78' formed of steel integral with the latch plate 50'. The second abutment surface 78' engages the first abutment surface 76' in a first condition illustrated in FIG. 8.

The second abutment surface 78' may be disposed on a substantially peg-shaped engagement feature 80'. The first abutment surface 76' may be disposed in a pocket 82' that may receive the substantially peg-shaped engagement feature 80' in the first condition. The pocket 82' may include a first deformable wall 84' comprising the deformable element on which the surface 76' may be disposed. The wall 84' is deformable in that it can be sheared, i.e., broken, and/or deflected, i.e., bent, when subjected to a vehicle impact loading condition of a predetermined magnitude as described below. When the wall 84' has two edges connected to the rest of the D-ring 48', one edge may fracture and the other may deflect at a predetermined torsional (i.e., pivot torque) magnitude, allowing the engagement feature 80' to move therepast. The substantially peg-shaped engagement feature 80' may be substantially square in shape.

Figure 8:
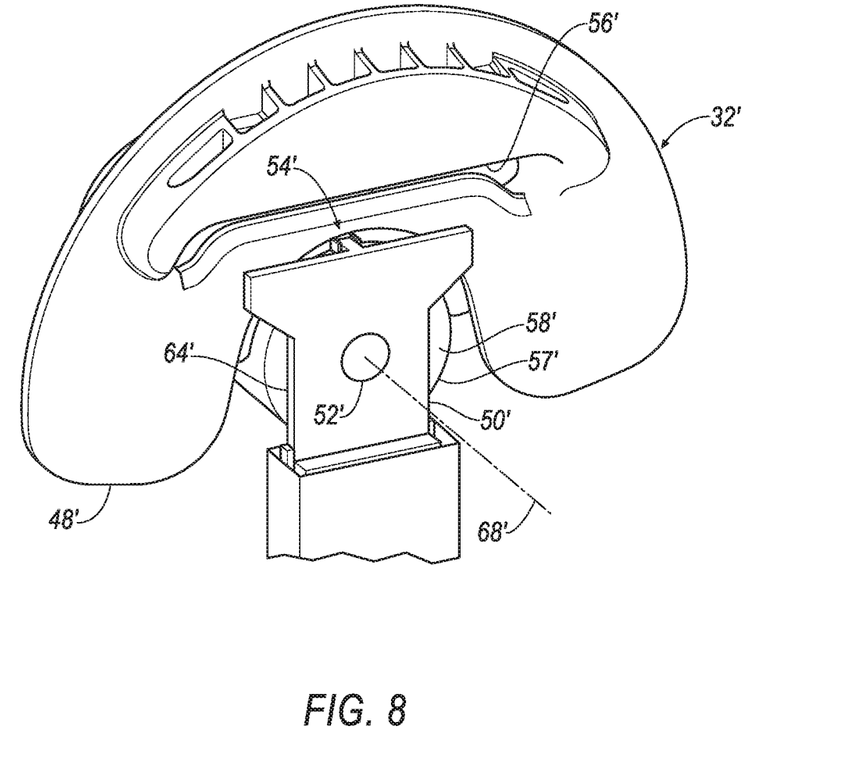
FIG. 8 is a perspective view of the latch plate assembly and buckle of FIG. 6 from a second direction.
Figure 9:
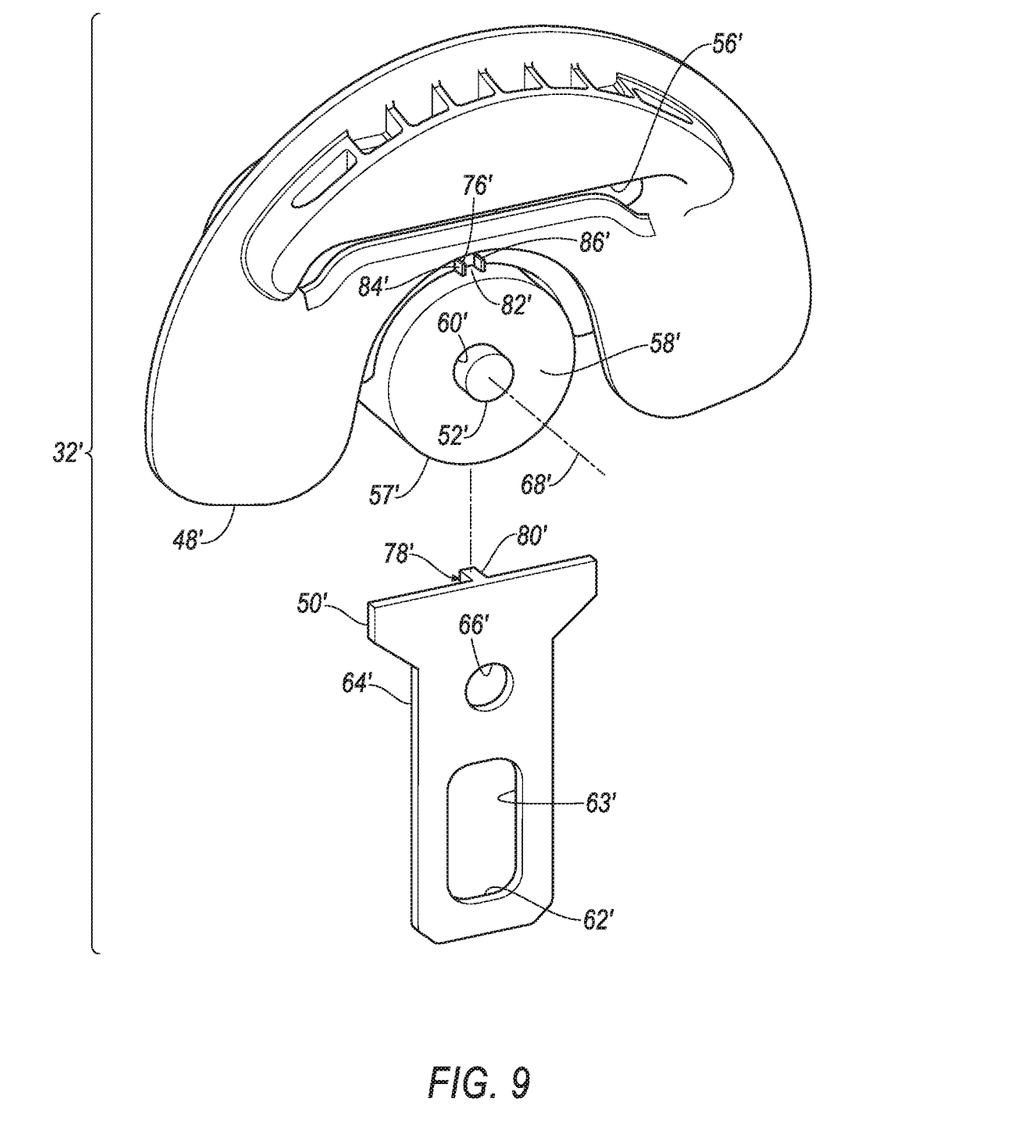
FIG. 9 is an exploded view of the latch plate assembly of FIG. 8.

As illustrated in FIGS. 8 and 9, the pocket 82' may be defined by both the first deformable wall 84' and a second deformable wall 86'. The walls 84', 86' may extend radially from the boss 57'. The torsional resistance provided by the pivot stop 54' may be increased by moving the walls 84', 86' and the engagement feature 80' further from the pivot axis 68'. The torsional resistance may alternatively be increased by providing the walls 84', 86' with thicker cross sections, particularly where the walls join the rest of the D-ring 48', as at the boss 57'. Pivoting of the D-ring 48' relative to the latch plate 50' is allowed when the predetermined magnitude of torsional resistance, i.e., torque, is exceeded and the deformable element deforms, e.g., one of the walls 84', 86' fractures, shears through, or bends.

In operation, the seatbelt 28 is placed across the occupant 16, engaging the latch plate assembly 32, 32' with the buckle 34. In the event of an impact, e.g., a frontal impact, the occupant 16 of the 14 has forward momentum relative to the rest of the vehicle 12. The forward inertial motion of the occupant 16, and particularly of the torso of the occupant 16, may act against the seatbelt 28. With a waist area of the occupant 16 engaging the lap band 44 and the upper torso of the occupant 16 engaging the shoulder band 46, the seatbelt 28 is placed in tension. An inertial force of the occupant 16 against the shoulder band 46 may result in deflection of the occupant's chest. A path of the shoulder band 46 across the upper torso is affected by an angle between the D-ring 48, 48' and he latch plate 50, 50'. FIG. 6 illustrates a neutral angle as may be maintained by the pivot stop 54, 54'. FIG. 7 illustrates a deflected angle as may be attained by the assembly 32, 32' sustaining an impact loading. The deflected angle may have a wide range, e.g., from 10 degrees to 90 degrees.

With a non-pivoting latch plate assembly, i.e., one in which the latch plate D-ring 48, 48', and the latch plate 50, 50' are unitary and integral, and do not permit relative movement, an upper end of the shoulder band 46 has been observed to engage occupants 16 at the shoulder with an inboard edge of the shoulder band 46 at or in engagement with a neck area of the occupant, with a larger area of engagement of the shoulder band 46 with an inboard side (i.e., a side proximate to a center of the vehicle 12 of the chest. Such a load path may result in a first magnitude of loading from the shoulder band 46 against the inboard side of the chest.

A pivoting latch plate assembly 32, 32' allows the D-ring 48, 48' to pivot forward relative to the latch plate 50, 50'. The pivot stop 54, 54' prevents pivoting between an unloaded D-ring 48, 48' and latch plate 50, 50'. It is only when a tension in the seatbelt 28 exceeds a predetermined value, e.g., 500 pounds, resulting in a corresponding pivot torque between the D-ring 48, 48' and the latch plate 50, 50' exceeds the predetermined torque of the pivot stop 54, 54', that the deformable element 70, 84' deforms and pivoting between the D-ring 48, 48' and the latch plate 50, 50' occurs. With such deflection, the shoulder band is allowed to follow a different path across the shoulder, with the shoulder band 46 engaging the shoulder at a location removed from the neck, and closed to an arm socket of the shoulder. In following such a path, the shoulder band 46 is positioned closer to a center of the upper torso, resulting in a more even distribution of loading, and a reduction in loading, across the upper torso.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt latch plate assembly comprising:
a latch plate;
a D-ring pivotably connected to the latch plate and including a slot elongated along a slot axis, the D-ring pivotable relative to the latch plate about a pivot axis transverse to the slot axis; and
a pivot stop disposed between and rotatably fixing the latch plate to the D-ring and the pivot stop including a deformable element,
wherein the deformable element is deformable at a predetermined pivot torque between the D-ring and the latch plate.

2. The assembly of claim 1, wherein the deformable element is formed of plastic and the latch plate is formed of steel.

3. The assembly of claim 1, wherein the deformable element is a shear pin disposed in an aperture in the D-Ring and in an aligned aperture in the latch plate.

4. The assembly of claim 3, wherein the shear pin is formed of plastic.

5. The assembly of claim 3, wherein a plurality of shear pins are disposed in an equal plurality of apertures in the D-ring and in an equal plurality of aligned apertures in the latch plate.

6. The assembly of claim 1, the pivot stop including:
a first abutment surface formed of plastic integral with the D-ring and defining the deformable element, and
a second abutment surface formed of steel integral with the latch plate and engaging the first abutment surface in a first condition.

7. The assembly of claim 6, wherein the first abutment surface is disposed on a substantially peg-shaped engagement feature, and the second abutment surface is disposed in a pocket substantially complementary to the substantially peg-shaped engagement feature and in receipt of the first abutment surface in the first condition.

8. The assembly of claim 7, wherein the pocket includes a deformable wall.

9. The assembly of claim 7, wherein the substantially peg-shaped engagement feature is substantially square in shape.

10. A seatbelt system comprising:
a seatbelt;
a D-ring including a slot elongated along a slot axis, the slot slidably receiving the seatbelt;
a latch plate;
a pivot pin pivotably connecting the D-ring and the latch plate and defining a pivot axis about which the D-ring may pivot relative to the latch plate, the pivot axis extending transverse to the slot axis;
a pivot stop disposed between the D-ring and the latch plate and rotatably fixing the D-ring to the latch plate to resist pivoting therebetween and the pivot stop including a deformable element;
a buckle selectively slidably receiving the latch plate; and
wherein the deformable element is deformable at a predetermined pivot torque between the D-ring and the latch plate.

11. The system of claim 10, wherein the deformable element is formed of plastic and the latch plate is formed of steel.

12. The system of claim 10, wherein the latch plate and the D-ring and the pivot pin are all formed of steel.

13. The system of claim 10, wherein the deformable element is a shear pin disposed in an aperture in the D-Ring and in an aligned aperture in the latch plate.

14. The system of claim 13, wherein the shear pin is formed of plastic.

15. The system of claim 13, wherein a plurality of shear pins are disposed in an equal plurality of apertures in the D-ring and in an equal plurality of aligned apertures in the latch plate.

16. The system of claim 10, the pivot stop including:
a first abutment surface formed of plastic integral with the D-ring and defining the deformable element; and
a second abutment surface formed of steel integral with the latch plate and engaging the first abutment surface in a first condition.

17. The system of claim 16, wherein the first abutment surface is disposed on a substantially peg-shaped engagement feature, and the second abutment surface is disposed in a pocket substantially complementary to the substantially peg-shaped engagement feature and in receipt of the first abutment surface in the first condition.

18. The system of claim 17, wherein the pocket includes a deformable wall.

19. The system of claim 17, wherein the substantially peg-shaped engagement feature is substantially square in shape.

20. A seatbelt latch plate assembly comprising:
a latch plate;
a D-ring pivotably connected to the latch plate;
a pivot stop disposed between and rotatably fixing the latch plate to the D-ring and the pivot stop including a deformable element;
wherein the deformable element is deformable at a predetermined pivot torque between the D-ring and the latch plate; and
wherein the deformable element is a shear pin disposed in an aperture in the D-Ring and in an aligned aperture in the latch plate.

* * * * *